United States Patent
Compton et al.

(10) Patent No.: US 9,887,019 B2
(45) Date of Patent: Feb. 6, 2018

(54) SYSTEMS AND METHODS FOR ELIMINATING MULTI-PATH ERRORS FROM ATOMIC INERTIAL SENSORS

(71) Applicant: Honeywell International Inc., Morris Plains, NJ (US)

(72) Inventors: Robert Compton, Loretto, MN (US); Karl D. Nelson, Plymouth, MN (US); Chad Fertig, Bloomington, MN (US)

(73) Assignee: Honeywell International Inc., Morris Plains, NJ (US)

(*) Notice: Subject to any disclaimer, the term of this patent is extended or adjusted under 35 U.S.C. 154(b) by 9 days.

(21) Appl. No.: 15/016,180

(22) Filed: Feb. 4, 2016

(65) Prior Publication Data

US 2017/0229203 A1    Aug. 10, 2017

(51) Int. Cl.
*G21K 1/06* (2006.01)
*G21K 1/00* (2006.01)

(52) U.S. Cl.
CPC .................................. *G21K 1/006* (2013.01)

(58) Field of Classification Search
CPC ........................................................ G01P 1/02
See application file for complete search history.

(56) References Cited

U.S. PATENT DOCUMENTS

| | | |
|---|---|---|
| 4,874,942 A | 10/1989 | Clauser |
| 4,992,656 A | 2/1991 | Clauser |
| 2009/0272887 A1 | 11/2009 | Fatemi et al. |
| 2014/0022534 A1* | 1/2014 | Strabley .................. G01P 21/00 356/72 |
| 2014/0375998 A1 | 12/2014 | Kasevich et al. |
| 2016/0216114 A1* | 7/2016 | Kotru ..................... G01C 19/58 |

OTHER PUBLICATIONS

Clade et al. 'Large Momentum Beam Splitter Using Bloch Oscillations' Jun. 29, 2009, Phys Review Lett, 102, 240402.*
Hamilton et al., "Concept of a miniature atomic sensor", "2014 International Symposium on Inertial Sensors and Systems (ISISS)", Feb. 25, 2014, pp. 14.
Muller et al., "Atom Interferometers with Scalable Enclosed Area", "Physical Review Letters", Jun. 19, 2009, pp. 1-4, Publisher: The American Physical Society.
European Patent Office, "Extended European Search Report for EP Application No. 16198302.8", "Foreign Counterpart to U.S. Appl. No. 15/016,180", dated May 19, 2017, pp. 1-8, Published in: EP.

* cited by examiner

*Primary Examiner* — Wyatt Stoffa
*Assistant Examiner* — Eliza Osenbaugh-Stewart
(74) *Attorney, Agent, or Firm* — Fogg & Powers LLC

(57) ABSTRACT

Systems and methods for eliminating multi-path errors from atomic inertial sensors are provided. In certain embodiments, a system for performing atom interferometry includes a vacuum cell containing multiple atoms and a first plurality of lasers configured to trap the atoms within the vacuum cell. The system further includes a second plurality of lasers configured to impart momentum to the atoms and direct the atoms down multiple paths, wherein a primary path in the multiple paths has a first and second component that converge at a converging point, wherein a diverging part of the primary path in which the first and second components are diverging is asymmetrical with respect to a converging part of the primary path in which the first and second components are converging, such that only the first and second components converge at the converging point wherein other paths do not converge at the converging point.

17 Claims, 3 Drawing Sheets

SYSTEMS AND METHODS FOR ELIMINATING MULTI-PATH ERRORS FROM ATOMIC INERTIAL SENSORS

STATEMENT REGARDING FEDERALLY SPONSORED RESEARCH OR DEVELOPMENT

This invention was made with Government support under Government Contract Number W31P4Q-13-C-0092 awarded by the US Army. The Government has certain rights in the invention.

BACKGROUND

In a traditional three light pulse atom interferometer, the first pulse acts as a beam-splitter, the second pulse acts as a mirror, and the third pulse acts as a final beam-splitter to recombine and read out the phase. The light pulse atom interferometer is sensitive to inertial forces like acceleration and rotation and inertial measurements can be made based on the phase that is read out. If there are inefficiencies in the steps, it may lead to a loss of interferometer contrast, which loss of contrast may lead to degradations in angular random walk (ARW) and velocity random walk (VRW) but does not cause instabilities in either scale factor or bias. However, in a large-momentum-transfer atom interferometer, the scale factor is enhanced by additional acceleration pulses, which increase the velocity of the atoms in one or both arms of the interferometer. Inefficiencies in these acceleration processes may have the potential to create multiple interferometer paths, which can add to the signal from the primary interferometer path, introducing bias and/or scale factor instability.

SUMMARY

Systems and methods for eliminating multi-path errors from atomic inertial sensors are provided. In certain embodiments, a system for performing atom interferometry includes a vacuum cell, wherein a plurality of atoms are contained therein; and a first plurality of lasers configured to trap at least one of the plurality of atoms within the vacuum cell. The system further includes a second plurality of lasers configured to impart momentum to the at least one of the plurality of atoms and direct the at least one of the plurality of atoms down a plurality of paths, wherein a primary path in the plurality of paths has a first component and a second component that converge at a converging point, wherein a diverging part of the primary path in which the first component and the second component are diverging is asymmetrical with respect to a converging part of the primary path in which the first component and second component are converging, such that only the first component and the second component of the primary path converge at the converging point wherein other paths in the plurality of paths do not converge at the converging point.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
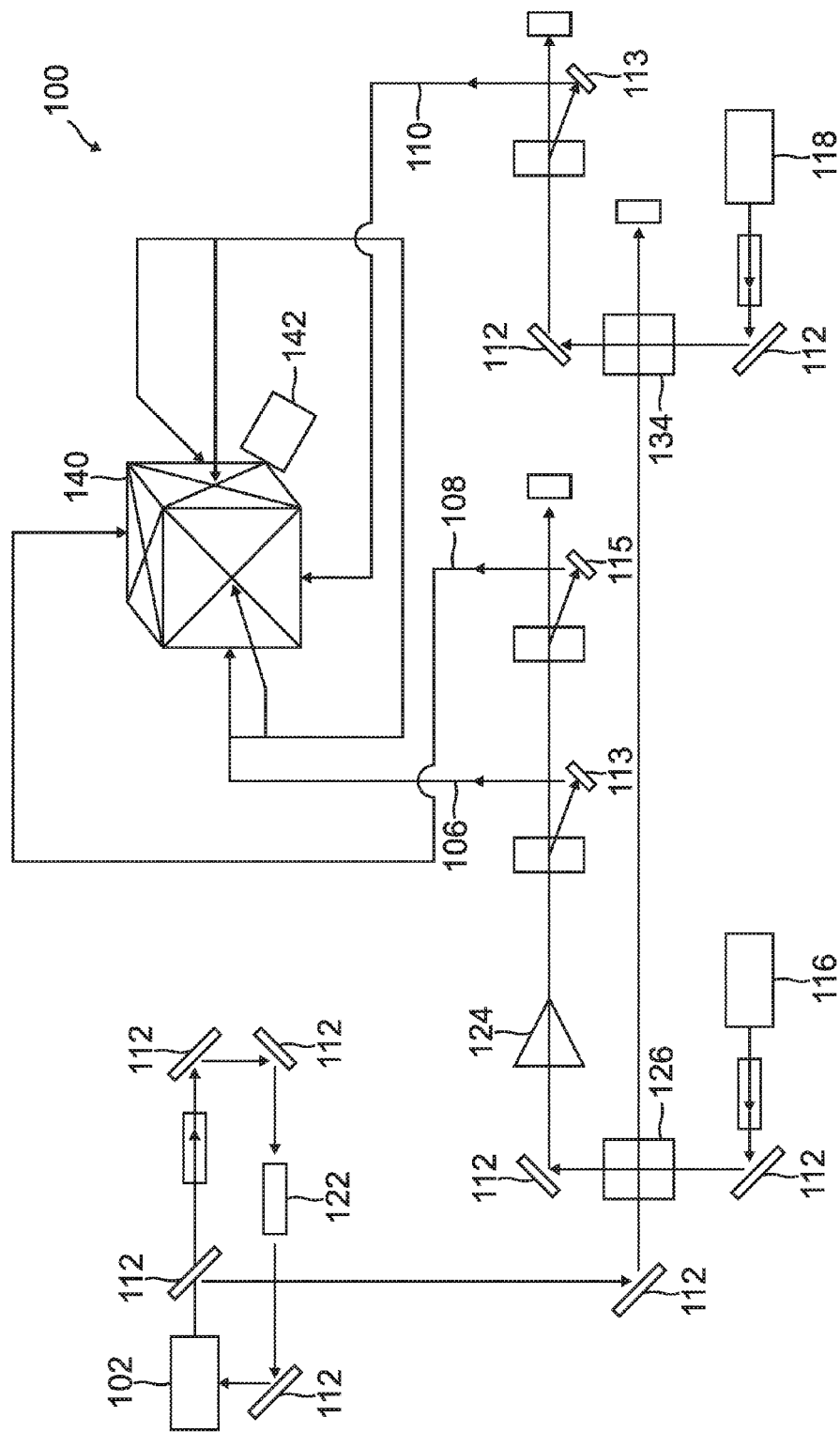
FIG. 1 is a block diagram of a system for providing atom interferometry in one embodiment described in the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Systems and methods for eliminating multi-path errors from atomic inertial sensors are provided. Frequently, in a large-momentum-transfer atom interferometer, atoms in paths that close near the same moment in time (for example within tenths of microseconds) as the primary path may contribute to the phase signal that is read out, thus affecting bias and/or scale factor stability. Atoms in paths that do not close don't contribute to the phase signal that is read out but may cause degradations in ARW/VRW due to contributions to a background signal. However, not all additional paths will close at the same moment as the primary path. Generally, paths that are symmetric in the overall distance traveled by each arm close at the same moment. This symmetry may be ensured by causing different arms of the interferometer to have the same number of segments with the same velocity and lasting the same duration. In implementations described herein, asymmetry may be introduced into the different arms of the interferometer. The asymmetry may destroy the coherence of unwanted paths without affecting the coherence of the primary path.

FIG. 1 is a diagram of a portion of a laser system 100 that is used to control and acquire the phase read out according to one embodiment. As described presently, the laser system 100 includes a master laser 102 that is frequency stabilized ("locked") to an atomic transition via vapor cell spectroscopy 122. A first slave laser 116 and a second slave laser 118 are offset-locked to the master laser 102 through respective phase-locked loops 126 and 134. The first slave laser 116 may be amplified by a tapered amplifier (TA) 124. Part of the radiation is deflected and frequency-shifted by an acousto-optical modulator (AOM) 113 to make up to four beams 106 that are directed into a magneto optical trap (MOT) 140. Deflection by a second AOM 115 forms a fifth trapping beam 108. The AOMs 113 and 115 are used for switching and frequency shifting. The second slave laser 118 is deflected by a third modulator and used as the sixth trapping beam 110. For atom interferometry, the slave offset locks 126 and 134 are detuned to increase the detuning from the single-photon resonance and only the fifth trapping beam 108 and sixth trapping beam 110 are used. To direct the master laser, the first slave laser, and the second slave laser through the system 100, a series of mirrors 112 reflect the lasers as needed.

In certain implementations, the four laser beams 106, the fifth trapping beam 108, and the sixth trapping beam 110 are directed by mirrors that are not shown to route the six different trapping beams into a vacuum cell containing alkali atoms such as rubidium, cesium, or other suitable alkali elements. The vacuum cell is part of the MOT 140. The trapping beams function to trap the atoms within the vacuum cell. When the atoms are trapped, the six trapping beams (or lasers other than the six trapping beams) can be adjusted by a processor or other control mechanism to both impart momentum to the atoms and to also split the wave function of the atoms such that an atom travels along different paths through the vacuum cell. For example, when there are two paths through the vacuum cell, the wave function will be split such that an atom travels along both paths through the vacuum cell. As the atom travels along the different paths within the MOT 140, the lasers that enter the vacuum cell are used to alter the paths of the atom such that it travels along a primary path and re-converges at a desired location that is incident on a photodetector 142. Based on the interference pattern produced by the converging wave function of the atom, inertial information such as velocity and angular rotation may be calculated.

As described above, in some examples of atom interferometers, an atom may travel along paths in addition to the primary path within the MOT 140. Paths that converge at the same moment as the primary path may contribute to the measurements of the phase signal. The paths that converge at the same moment as the primary path may negatively affect the bias or scale factor stability. Further only paths that are symmetric in the overall distance traveled by each arm converge at the same point. Symmetry can be ensured by causing both arms of the primary path to have the same number of segments with the same velocity that last the same duration. In order to eliminate paths other than the primary path from closing at the same moment as the primary path, an asymmetry may be introduced between the different paths by changing the duration of one or more steps. For example, the duration of the highest-velocity segment may be changed because that segment of the primary path has a different velocity than the segments of other possible competing path. This asymmetry will cause the primary path to close at a different time. Due to the changing of the duration of the highest velocity step causing the primary path to close at a different time, an additional asymmetry may be introduced in one of the lower-velocity steps—that is, waiting the required additional time for the asymmetric path to close before applying the final combining laser pulse. For example, the duration of the highest-velocity segment of the primary path may be increased by a time $dt_1$. This will cause the arms to miss each other at the readout pulse by a distance of at least $2 \times V_{recoil} \times dt_1$, where $V_{recoil}$ is the recoil velocity, or the velocity given to the atom by absorption of a single photon. Accordingly, the duration of the lower-velocity segment may be increased by $dt_2 = dt_1 V_{max}/V_{lower}$ so that the combining pulse comes as the two components of the primary path close. In certain implementations, the competing paths, while not closing at the same time as the primary path, may be used in order to probe errors in the interferometer. In other implementations, the competing paths may be used in order to achieve phase disambiguation.

Figure 2:
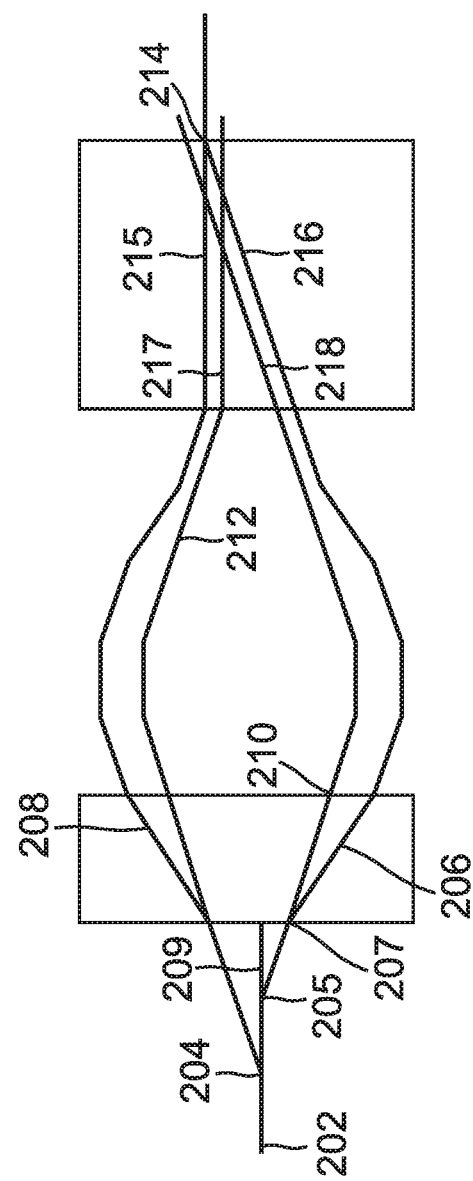
FIG. 2 is a diagram of possible paths followed by atoms in an atom interferometer in one embodiment described in the present disclosure.

FIG. 2 is a diagram illustrating possible asymmetric paths that the highest velocity particles may follow within a MOT such as the MOT 140 in FIG. 1. As illustrated a particle travels along path 202 where the vertical direction represents a spatial separation between the different paths and the horizontal direction represents either a temporal change as the atoms travel along the path or the distance traveled in a particular direction. At point 204, a laser is used split the wave function of the particle. When the wave function of the particle is split, momentum is imparted to a part of the wave function of that particle such that the particle travels along two diverging components of a path. At 205 and 207, additional momentum is imparted with subsequent laser pulses. Imperfection in the pulses may result in particles that do not receive the additional momentum, which then travel paths 209 or 210 and 212. A primary path includes two segments 206 and 208 that close at point 214. Lasers function as mirrors to direct the particles along the primary path, which is the only path that includes segments 206 and 208. Further, another laser pulse functions to combine the particles at closing point 214. In the primary path, segments 206 and 208 represent the segments that have a higher relative velocity than any segment of any competing paths such as 209, 210 and 212. As the segments 206 and 208 have the highest relative velocity, the duration of segments 215, 216 which create paths that close at point 214 is necessarily too long for the other segments 217 and 218, which will converge sooner. In one implementation, to make the paths asymmetrical, the duration of travel for all particles is increased when the primary particles are in segments 206 and 208, and the duration of travel for all particles is increased when the primary particles are in segments 215, 216, such that the paths containing segments 208 and 206 converge at point 214, where a combining pulse can facilitate measurement of any interference patterns created by the particles. In this manner, bias and scale factor errors may be reduced as competing paths converge at locations other than point 214.

Figure 3:
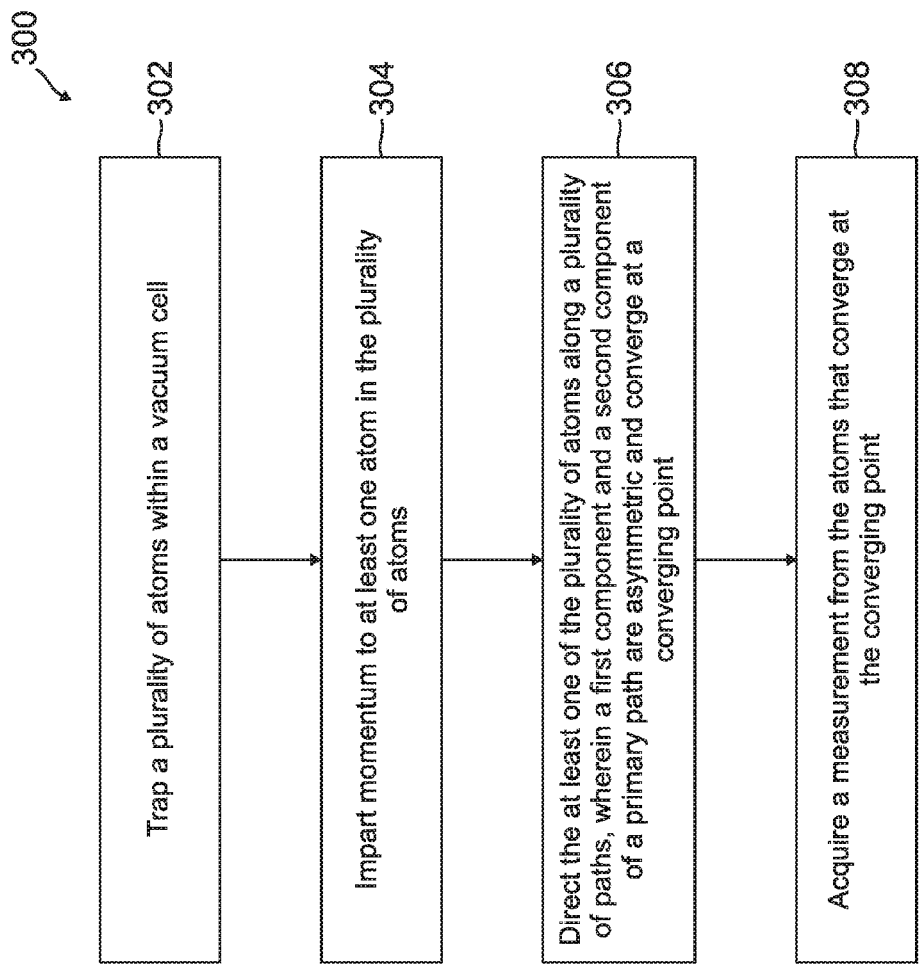
FIG. 3 is a flow diagram for a method for providing atom interferometry in one embodiment described in the present disclosure.

FIG. 3 is a flow diagram of a method 300 for performing atom interferometry. Method 300 proceeds at 302 where a plurality of atoms are trapped within a vacuum cell. For example, a vacuum cell may be a magneto optical trap containing a plurality of atoms such as rubidium or other alkali element. Lasers may be directed into the magneto optical trap to trap the atom within the magneto optical trap. Method 300 then proceeds at 304, wherein momentum may be imparted to at least one atom in the plurality of atoms. For instance, lasers may impart momentum to some of the trapped atoms. In one implementation, the lasers that trapped the atoms are redirected to impart momentum to the atoms. Alternatively, lasers other than the trapping lasers may be used to impart momentum to the atoms.

In certain embodiments, method 300 proceeds at 306, where at least one of the plurality of atoms is directed along a plurality of paths, wherein a first component and a second component of a primary path are asymmetric and converge at a converging point. For example, lasers may impinge on the atoms as they travel along the different components causing the atoms to travel along converging paths. As the primary path is asymmetric, other paths that converge will not converge at the same time and place as the primary path. Method 300 proceeds at 308, where a measurement is acquired from the atoms that converge at the converging point. These measurements can be used in acquiring measurements such as inertial measurements.

Example Embodiments

Example 1 includes a system for performing atom interferometry, the system comprising: a vacuum cell, wherein a plurality of atoms are contained therein; a first plurality of lasers configured to trap at least one of the plurality of atoms within the vacuum cell; a second plurality of lasers configured to impart momentum to the at least one of the plurality of atoms and direct the at least one of the plurality of atoms down a plurality of paths, wherein a primary path in the plurality of paths has a first component and a second component that converge at a converging point, wherein a diverging part of the primary path in which the first component and the second component are diverging is asymmetrical with respect to a converging part of the primary path in which the first component and second component are converging, such that only the first component and the second component of the primary path converge at the converging point wherein other paths in the plurality of paths do not converge at the converging point.

Example 2 includes the system of Example 1, wherein the at least one of the plurality of atoms traveling along the first component and the second component travel for a different duration than other atoms traveling on the other paths before arriving at the converging point.

Example 3 includes the system of any of Examples 1-2, wherein atoms that travel along the other paths are measured to determine when errors arise.

Example 4 includes the system of any of Examples 1-3, wherein atoms that travel along the other paths are measured to acquire information for phase disambiguation.

Example 5 includes the system of any of Examples 1-4, wherein the first plurality of lasers and the second plurality of lasers are the same plurality of lasers.

Example 6 includes the system of any of Examples 1-4, wherein the at least one of the plurality of atoms that travel along the primary path are measured at the converging point, wherein the measurements are processed to acquire inertial data.

Example 7 includes the system of any of Examples 1-5, wherein the first plurality of lasers are created by a plurality of slave lasers that are locked to a master laser.

Example 8 includes a method for performing atom interferometry, the method comprising: trapping a plurality of atoms within a vacuum cell; imparting momentum to at least one atom in the plurality of atoms; directing the at least one of the plurality of atoms down a plurality of paths, wherein a primary path in the plurality of paths has a first component and a second component that converge at a converging point, wherein a diverging part of the primary path in which the first component and the second component are diverging is asymmetrical with respect to a converging part of the primary path in which the first component and second component are converging, such that only the first component and the second component of the primary path converge at the converging point wherein other paths in the plurality of paths do not converge at the converging point; and acquiring a measurement from the atoms that converge at the converging point.

Example 9 includes the method of Example 8, wherein the at least one of the plurality of atoms traveling along the first component and the second component travel for a different duration than other atoms traveling on the other paths before arriving at the converging point.

Example 10 includes the method of any of Examples 8-9, further comprising determining when errors arise from measurements of atoms that travel along the other paths.

Example 11 includes the method of any of Examples 8-10, further comprising acquiring information for phase disambiguation from measurements of atoms that travel along the other paths.

Example 12 includes the method of any of Examples 8-11, wherein the plurality of atoms are trapped within the vacuum cell and the momentum is imparted to the at least one atom in the plurality of atoms are imparted by a plurality of lasers.

Example 13 includes the method of Example 12, wherein the plurality of lasers are created by a plurality of slave lasers that are locked to a master laser.

Example 14 includes the method of any of Examples 8-13, wherein the plurality of atoms are trapped within the vacuum cell by a first plurality of lasers and the momentum is imparted to the at least one atom in the plurality of atoms are imparted by a second plurality of lasers.

Example 15 includes the method of any of Examples 8-14, further comprising calculating inertial data from the measurement.

Example 16 includes a system for performing atom interferometry, the system comprising: a master laser a plurality of slave lasers, the plurality of slave lasers are locked to the master laser a vacuum cell having a plurality of atoms contained therein, wherein the plurality of slave lasers are directed into the vacuum cell to trap at least one of the plurality of atoms within the vacuum cell; a second plurality of lasers configured to impart momentum to the at least one of the plurality of atoms and direct the at least one of the plurality of atoms down a plurality of paths, wherein a primary path in the plurality of paths has a first component and a second component that converge at a converging point, wherein a diverging part of the primary path in which the first component and the second component are diverging is asymmetrical with respect to a converging part of the primary path in which the first component and second component are converging, such that only the first component and the second component of the primary path converge at the converging point wherein other paths in the plurality of paths do not converge at the converging point. a detector configured to provide a signal from atoms detected at the converging point; and a processor configured to calculate measurements from the signal.

Example 17 includes the system of Example 16, wherein the at least one of the plurality of atoms traveling along the first component and the second component travel for a different duration than other atoms traveling on the other paths before arriving at the converging point.

Example 18 includes the system of any of Examples 16-17, wherein atoms that travel along the other paths are measured to determine when errors arise.

Example 19 includes the system of any of Examples 1-18, wherein atoms that travel along the other paths are measured to acquire information for phase disambiguation.

Example 20 includes the system of any of Examples 1-19, wherein the plurality of slave lasers and the second plurality of lasers are the same plurality of lasers.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system for performing atom interferometry, the system comprising:
   a vacuum cell, wherein a plurality of atoms are contained therein;
   a first plurality of lasers configured to trap at least one of the plurality of atoms within the vacuum cell;
   a second plurality of lasers configured to impart momentum to the at least one of the plurality of atoms and direct the at least one of the plurality of atoms down a plurality of paths, wherein a primary path in the plurality of paths has a first component and a second component that converge at a converging point, wherein a diverging part of the primary path in which the first component and the second component are diverging is asymmetrical with respect to a converging part of the primary path in which the first component and second component are converging, such that a diverging time when the first component and the second component are diverging is different than a converging time when the first component and the second component are converging, wherein only the first component and the second component of the primary path converge at the converging point wherein other paths in the plurality of paths do not converge at the converging point.

2. The system of claim 1, wherein the at least one of the plurality of atoms traveling along the first component and the second component travel for a different duration than other atoms traveling on the other paths before arriving at the converging point.

3. The system of claim 1, wherein the asymmetry of the diverging time and the converging time is introduced after the formation of the plurality of paths.

4. The system of claim 1, wherein the first plurality of lasers and the second plurality of lasers are the same plurality of lasers.

5. The system of claim 1, wherein the at least one of the plurality of atoms that travel along the primary path are measured at the converging point, wherein the measurements are processed to acquire inertial data.

6. The system of claim 1, wherein the first plurality of lasers are created by a plurality of slave lasers that are locked to a master laser.

7. A method for performing atom interferometry, the method comprising:
trapping a plurality of atoms within a vacuum cell;
imparting momentum to at least one atom in the plurality of atoms;
directing the at least one of the plurality of atoms down a plurality of paths, wherein a primary path in the plurality of paths has a first component and a second component that converge at a converging point, wherein a diverging part of the primary path in which the first component and the second component are diverging is asymmetrical with respect to a converging part of the primary path in which the first component and second component are converging, such that a diverging time when the first component and the second component are diverging is different than a converging time when the first component and the second component are converging, wherein only the first component and the second component of the primary path converge at the converging point wherein other paths in the plurality of paths do not converge at the converging point; and
acquiring a measurement from the atoms that converge at the converging point.

8. The method of claim 7, wherein the at least one of the plurality of atoms traveling along the first component and the second component travel for a different duration than other atoms traveling on the other paths before arriving at the converging point.

9. The method of claim 7, wherein the asymmetry of the diverging time and the converging time is introduced after the formation of the plurality of paths.

10. The method of claim 7, wherein the plurality of atoms are trapped within the vacuum cell and the momentum is imparted to the at least one atom in the plurality of atoms are imparted by a plurality of lasers.

11. The method of claim 10, wherein the plurality of lasers are created by a plurality of slave lasers that are locked to a master laser.

12. The method of claim 7, wherein the plurality of atoms are trapped within the vacuum cell by a first plurality of lasers and the momentum is imparted to the at least one atom in the plurality of atoms are imparted by a second plurality of lasers.

13. The method of claim 7, further comprising calculating inertial data from the measurement.

14. A system for performing atom interferometry, the system comprising: a master laser a plurality of slave lasers, the plurality of slave lasers are locked to the master laser a vacuum cell having a plurality of atoms contained therein, wherein the plurality of slave lasers are directed into the vacuum cell to trap at least one of the plurality of atoms within the vacuum cell; a second plurality of lasers configured to impart momentum to the at least one of the plurality of atoms and direct the at least one of the plurality of atoms down a plurality of paths, wherein a primary path in the plurality of paths has a first component and a second component that converge at a converging point, wherein a diverging part of the primary path in which the first component and the second component are diverging is asymmetrical with respect to a converging part of the primary path in which the first component and second component are converging, such that a diverging time when the first component and the second component are diverging is different than a converging time when the first component and the second component are converging, wherein only the first component and the second component of the primary path converge at the converging point wherein other paths in the plurality of paths do not converge at the converging point; a detector configured to provide a signal from atoms detected at the converging point; and a processor configured to calculate measurements from the signal.

15. The system of claim 14, wherein the at least one of the plurality of atoms traveling along the first component and the second component travel for a different duration than other atoms traveling on the other paths before arriving at the converging point.

16. The system of claim 14, wherein the asymmetry of the diverging time and the converging time is introduced after the formation of the plurality of paths.

17. The system of claim 14, wherein the plurality of slave lasers and the second plurality of lasers are the same plurality of lasers.

* * * * *